United States Patent [19]

Nolf et al.

[11] Patent Number: 4,648,168

[45] Date of Patent: Mar. 10, 1987

[54] OPTICAL FIBRE BREAKOUT

[75] Inventors: Jean-Marie E. Nolf, Hamme-Mille; Hubert Genbrugge, Wezembeek-Oppem; Valere Buekers, Zelem-Halen; Luiz N. Mendes, Begijnendijk; Jos Doucet, Kessel-Lo; Jan Vansant, Louvain, all of Belgium

[73] Assignee: N.V. Raychem S.A., Kessel-lo, Belgium

[21] Appl. No.: 684,196

[22] Filed: Dec. 18, 1984

[30] Foreign Application Priority Data

Dec. 19, 1983 [GB] United Kingdom ................ 8333721
Jan. 30, 1984 [GB] United Kingdom ................ 8402355
Jun. 19, 1984 [GB] United Kingdom ................ 8415565

[51] Int. Cl.$^4$ .................... B23P 11/02; G02B 6/36
[52] U.S. Cl. .................... 29/447; 350/96.2
[58] Field of Search ............ 350/96.2, 96.21, 96.22; 29/447

[56] References Cited

U.S. PATENT DOCUMENTS

| 4,019,241 | 4/1977 | Logan | 350/96.21 |
| 4,028,162 | 6/1977 | Cherin et al. | 350/96.21 |
| 4,029,390 | 6/1977 | Chinnock et al. | 350/96.21 |
| 4,049,414 | 9/1977 | Smith | 350/96.21 |
| 4,062,620 | 12/1977 | Pirolli | 350/96.2 |
| 4,305,642 | 12/1981 | Bloodworth et al. | 350/96.2 |
| 4,327,963 | 5/1982 | Khoe et al. | 350/96.2 |
| 4,333,705 | 6/1982 | Mead | 350/96.2 |
| 4,373,776 | 2/1983 | Purdy | 350/96.2 |

Primary Examiner—Howard N. Goldberg
Assistant Examiner—Steven Nichols
Attorney, Agent, or Firm—Dennis E. Kovach; Herbert G. Burkard

[57] ABSTRACT

A technique for protecting an optical fibre breakout particularly from a cable 1 comprising a core 2, a plurality of loose fibres 3 and a jacket 5. The jacket 5 and core 2 are stripped back and the fibres encased in protective tubes 7. This may be done one fibre at a time by removing a portion of cable jacket remote from the end and withdrawing each fibre from under the remaining end portion of jacket. The cable may be held in a holding tool and the fibres inserted into their protective tubes by means of an insertion tool.

5 Claims, 18 Drawing Figures

OPTICAL FIBRE BREAKOUT

This invention relates to a technique for protecting a breakout from an optical fibre cable, particularly one in which a plurality of bare optical fibres is mounted directly onto a grooved core.

Although the invention is applicable to break-outs from a variety of multifilament cables it will be described principally in terms of the following system where the greatest advantages are expected: a plurality of optical fibres (generally five, or multiples of five, and particularly ten for a distribution cable) are mounted on a core which has longitudinal grooves therein which generally run in a shallow helical path around the core. Each of these grooves carries one (or more) optical fibres. The core, which is generally known, and will be referred to herein by the French word "jonc" usually comprises a polymeric material reinforced with a central wire reinforcement to prevent the cable being sent through a radius of curvature that would damage the optical fibres. Incidentally, the reason for the fibres following a helical, rather than a straight, path along the jonc is to make the cable more tolerant of being bent. The jonc and fibres are then provided with an outer jacket comprising, for example, one or more helical wraps of a polyethylene tape.

A problem arises when two such cables are to be spliced or when such a single cable is to be terminated by connecting it, for example, to a distribution frame for connection to larger feeder cables from the transmitter, or to a drop terminal for connection to smaller drop cables to the consumers. The problem is how to turn an end portion of a single multi-fibre cable (often as much as 2 m) into a plurality of free individually protected optical fibres. This change is known as break-out.

One aspect of the problem is addressed in European patent publication No. 0063506. Here, the ten optical fibres are removed from the jonc back to a certain position. The exposed portion of the jonc is then cut off. A sleeve (known as a a barrel) is then provided in the form of a hollow cylinder having one closed end, which end is perforated by ten holes, from each of which extends a protective tube. The optical fibres are then inserted into the open end of the cylinder and then through respective holes and protective tubes. Once all ten fibres are inserted in this way, the barrel is slid home towards the cable so that the new end of the cable proper lies within the cylinder.

A modification of this idea is also disclosed in European patent publication No. 0063506. In this disclosure, the hollow cylinder or barrel has ten ribs running longitudinally along its inner surface. Each rib has a hole therein which communicates with the holes and protective tubes of the closed face. Each rib, when the sleeve or barrel is installed, lies within a groove of the jonc. This provides better protection for the optical fibres, and in particular prevents the barrel rotating with respect to the jonc.

Published European patent application No. 0092441 discloses a modified sleeve or barrel which abuts against an end of the jonc rather than receiving the whole jonc within it and which has a series of open channels along its outer surface into which the protective tubes may be snap fitted.

A slightly different way of installing such a device has also been proposed. A spreader barrel is provided which is frusto conical and which has ten channels along its tapered surface. A portion of the jacket of the optical fibre cable is removed, and the spreader barrel offered-up to the end of the jonc so that the fibres on the jonc enter the channels on the barrel and from there enter the protective tubes associated therewith. The barrel is then advanced up the jonc in stages until a sufficient length of free individually protected fibres has been provided. The exposed length of jonc is then cut-off.

In each of these techniques some form of protective sheath may be provided around the cable at the point where the fibres enter the protective tubes. This secures the protective tubes and prevents the optical fibres bending too sharply at that point.

It can be seen from the above review, which is believed to summarize developments to date in this field, that considerable technical effort has been expended in protecting the fibres at the vulnerable region where they leave the jonc. The installed products have, in general, been acceptable: for example, fibre microbends can be avoided, strain relief to the protective tubes can be provided whilst leaving the fibres themselves free to move, and environmental sealing can be maintained under test conditions.

Unfortunately, installation of the products described can be unacceptably craft-sensitive under field conditions: the fibre damage that one hopes to avoid by using these products is likely to occur during their installation. For example, an attempt to advance a spreader barrel clamping all ten fibres can cause the fibres to break or to bend such that their attenuation is permanently increased. Alternatively, the presence of up to, say, 2 m length of ten free fibres before insertion into their protective tubes is likely to result in considerable fibre damage. This may also cause repeated confusion to the installer who must for example, match colour coding of the protective tubes to fibre position on the jonc. Furthermore, considerable difficulty may be experienced in feeding the fibres into their protective tubes.

We have discovered that installation can be simplified and made more reliable.

Thus the invention provides a method of terminating a cable comprising a plurality of optical fibres surrounded by a cable jacket, in which:

(a) a length of cable jacket is removed from a portion of the cable, leaving in place a further length of jacket nearer to the end to be terminated;

(b) the fibres are withdrawn from under said further length of jacket such that they leave the cable at said portion;

(c) the fibres thus withdrawn are inserted into individual protective tubes; and (d) the further length of jacket is removed.

The invention also provides a kit-of-parts suitable for terminating an optical fibre cable, which comprises: a plurality of protective tubes each suitable for housing individual optical fibres; a heat-shrinkable sleeve suitable for securing the tubes with respect to the terminated cable; means for identifying respective protective tubes; and means for correlating the identification of the tubes with respective fibres of the cable.

The invention further provides a method of terminating a cable comprising a plurality of optical fibres surrounded by a cable jacket, in which:

(a) a length of cable jacket is removed from a portion of the cable, exposing a plurality of optical fibres;

(b) the fibres are inserted into individual protective tubes; and (c) an environmental seal is provided at either or both end portions of a protective tube by means of a gel which prevents contaminants passing along a fibre.

In a further aspect, the invention provides an insertion tool for inserting an optical fibre into a protective tube, which comprises:

guide means for accepting an end of the fibre;
means for locating the fibre;
means for locating the tube, the means for locating the fibre and the means for locating the tube being such that end portions of the fibre and tube have substantially the same axis; and
means for advancing the fibre and/or the tube along said axis without damaging the fibre.

In a still further aspect, the invention provides a holding tool for holding an optical fibre cable during termination thereof, which comprises:

first and second holding means for holding longitudinally separated first and second portions of the cable such that a third portion, between said first and second portions, is accessible for removal therefrom of a jacket of the cable to expose fibres of the cable and/or for removal therefrom of fibres of the cable; and
means for rotation of the cable about its longitudinal axis.

Each of the above tools may be provided with (either as a separate article or as markings thereon) means for correlating the identification of the tubes with respective fibers as mentioned above in connection with the kit of parts.

With regard to the insertion tool, the means for locating the tube and the fibre may be grooves or holes in the tool, and the guide means may be a tapered end portion of one of those grooves or holes. The advancing means preferably comprises one or more rollers (by which term we do not intend to be limited by any relative width and diameter) against which the tube or fibre bears. A pair of rollers may of course be provided, between which the tube or fibre passes. We prefer that the tube be held and the fibre be driven into the tube since this allows an infinite length of fibres to be inserted whilst employing a simple device for holding the tube. The tool may be designed to deal with one tube and fibre, or with several substantially simaltaneously. The advancing means may be driven by hand, but we prefer that an electric or other motor be employed. We prefer that the advancing means be capable of advancing the fibre and/or tube in each of two mutually opposite directions. This is particularly useful where the fibres to be protected by the tubes are from two cables to be spliced as an in-line splice. The reason is simply that the free ends of the fibres from one cable will face the opposite direction to those from the other cable and it may be inconvenient to rotate the installation tool to deal with the different directions in which the two sets of tubes must be fed. The groove or hole of the tool within which the tube is held will preferably be of greater diameter than the groove or hole where the fibre is held, due to the greater diameter of the tube. In such a case, the tube will be held fixed and the fibre will be advanced into it.

The kit comprising the protective tubes may be supplied with various means for ordering or distinguishing the protective tubes, for example an organizer to which the tube may be attached by for example pressure-sensitive adhesive patches, flaps stamped out of the material of the board having slots therein, and discrete hooks or clamps attached to the organizer. In general, any means for affixing may be provided that allows each tube to be identified and that allows the tube to be removed, preferably by simple lateral movement away from the organizer rather than by, for example, longitudinal withdrawl through a hole closed in cross-section.

Instead of one organizer being provided, on which all of the protective tubes are organized, two or more organizers may be provided on each of which is located one or more tubes. This arrangement may be preferred, when the optical fibre cable is to be terminated for the purpose of making a splice to another cable. The reason for this is as follows; splices between optical fibre cables involve the use of a splice organizer which generally comprises a series of plates on each of which lies one or more splices and several turns of fibre either side of the splice or splices. The purpose of the spare turns of fibre is to allow the splice to be made in a machine some short distance from the splice organizer. It can now be seen that, with modification, such a splice organizer, can be used to organize the protective tubes of the present invention before use. The modification required of the splice organizer is firstly that it will contain, say, ten protective tubes, and secondly that each of these tubes will be broken at about their centre points (where the splice would be in a standard splice organizer) so that fibres can be inserted into each half tube from their respective joncs and emerge at the middle of the tubes ready for splicing.

A break-out can be made using the kit or method the invention in a variety of different ways. In particular the order of the various steps may be varied. Since any one acceptable sequence of steps may be quite complex, the kit may contain therein a list of the steps to be taken.

Some of the basic steps are as follows:

1. Remove the cable jacket
2. Separate the fibres from the jonc
3. Cut off exposed jonc
4. Insert fibres into protective tubes
5. Optionally provide a barrel or other support at the cut end of the jonc
6. Provide protective sheaths over break out regions.

The three basic orders in which the important steps may be performed are as follows:

(A) Remove fibres and insert into tubes both one-by-one
(B) Remove all fibres (i.e. remove entire end portion of cable jacket) and then insert into tubes one-by-one
(C) Remove all fibres, and then insert into tubes simaltaneously.

It will be seen that the method of the invention allows (A) to be carried out which is far less likely to cause damage than (B) or (C). The fibres are removed from the jonc generally in a specified order, and in any case in an identifiable way, and each is inserted into one end of a protective tube on the organizer. The ends of the tubes into which the fibres are inserted will be identified either by some characteristic of the tubes themselves (such as by colour coding) or by virtue of their relative position on an organizer. Furthermore, the tubes will be identifiable at their other end, (again intrinsically or by simply tracing back along the tube) so that one can tell from the free end of each tube which fibre it contains A preferred technique is to colour code one end of each tube, and then insert the fibre into the other end. After insertion, the free end of the tube will thus bear an indication of which fibre it contains. Each fibre in the cable will in general be identifiable by means of its position together with some means which makes one of the fibre positions unique. The means for correlating referred to above can then be used to tell the installer which (say colour-coded) tube to use over which fibre.

Where all fibres are removed from the jonc before any is inserted into a tube, we prefer that an organizer be provided which has means for temporarily holding the fibres so that they can be removed one-by-one in an orderly fashion for insertion into the tubes. The disadvantage inherent in all prior art methods of having all the fibres loose can therefore be avoided by the present invention, even if all fibres are removed from the jonc as a first step. An advantage, incidentally, of removing all the fibres from the jonc in this way is that the unwanted length of jonc can be cut off early in the installation. This can be an advantage if a very long breakout is being prepared. The means for temporarily fixing the fibres to the organizer may, for example, be one of the types described below for holding the protective tubes to the organizer.

The organizer may be a board which is preferably flat and serves also as a work surface for supporting various other pieces of equipment (to be described below) useful for performing the breakout. In one alternative, however, the organizer comprises a cylinder on or in which the protective tubes are mounted. One way of mounting the tubes is to pass them from one end plate of the cylinder to another. Alternatively, they can be mounted on the outer surface of the cylinder by wrapping them in for example a helical pattern first with say, a left-hand turn and then with a right-hand turn for easy removal.

Both sides of the board may be used, this being particularly preferred where a break-out for a splice is to be made, since twice as as many protective tubes will be required. Rather than having the ten tubes for one cable break-out on one side and ten for the other cable break out on the other side, we prefer that each set of ten tubes describes a certain path on one side of the board, then passes through a hole in the board and describes a further path on the other side. In this way, both sets of tubes for the two break-outs can be on the same one side of the board, and both sets of tubes for the splice will be on the same other side of the board. The board is therefore used one side up for the two break-outs and then turned upside down for the splice. The tubes (now containing the fibres) will then be disconnected from the board (this may require cutting the board if the tubes pass from one side to the other through a hole) and the tubes stowed into a suitable splice organizer.

In order to carry out the difficult operation of removing the fibres from the jonc, the optical fibre cable is preferably supported in the holding tool. The organizer board, where provided, may have markings thereon indicating where this tool should be positioned for easiest insertion of the fibres into the tubes. In its simplest form the holding means of the tool may be vice jaws, and the holding means may be secured to the board, for example, by a suction pad or a mechanical arrangement such as a clamp or a nut and bolt. The cable can then be held in the jaws of the vice while its jacket is removed, and the fibres separated from the jonc and inserted into the correct tubes.

The holding tool has means for rotation of the cable so as to bring different fibres into a convenient position for removal from the jonc. This means for rotation is preferably hand operated, and preferably indexed so that each rotational step brings a new fibre into position. Each step for a ten fibre cable would therefore be 36°.

The tool is preferably able to accept a piece of optical fibre cable remote from an end, i.e. any clamping arrangement in the tool should be split in cross-section allowing lateral insertion. In the cable accessories art this is described as wrap-around, as opposed to tubular. The reason is simply ease of insertion and removal of the cable when making long break-outs.

The tool preferably incorporates a magnifying lens to aid insertion of the fibres into the tube. Where the lens is not part of the tool, it may simply be supplied as part of a kit.

The tool supports the cable at two positions along the cable. At one of these positions the cable may merely rest in a groove and be free to rotate; at the other position, however, the tube is clamped by the means mentioned above to cause rotation, preferably by a wrap-around barrel which is first assembled around the cable and then slid down the cable until it engages the rotation mechanism of the tool. This barrel may serve not only to grip the cable but also to receive the ends of the protective tubes when they have been slid over the fibres to their full extent.

The holding tool allows the method of break-out of the invention to be efficiently performed. The cable is positioned in the tool such that its free end extends the required break-out length (say up to 2 m) past the support within which the cable is clamped by the barrel. The passive support of the tool will hold the cable at a position about 80–180 mm towards its free end. A short piece of cable is therefore held between the two supports. The jacket is then removed from this piece of cable, or from part of it, a length of about 80–120 mm being preferred, to produce a "window" of exposed jonc and fibres.

A fibre is then lifted off the jonc in this window (this can be done by flexing the cable) and pulled to withdraw it from the length of cable down-stream of the tool, which is still covered with the cable jacket. Once a fibre has been removed in this way, it can then be inserted into the appropriate protective tube. This technique therefore allows the fibres to be dealt with singly, thus avoiding the simaltaneous release of all ten unprotected fibres.

Two alternative ways of lifting a fibre off the jonc will be described. First, a small tool with a pressure-sensitive adhesive applied to an end, or a piece of mastic, may be used to lift a fibre sufficiently far off the jonc for it to be grasped by hand. Secondly, the initial lifting may be achieved by pushing one or more optical fibres from the free end of the cable. A special tool may be used to push the fibres from the end of the cable. If one fibre only is to be lifted at a time the special pushing tool may comprise a cylinder with a V-shaped internal projection. The cylinder is pushed over the jonc at the free end of the cable so that the V-shaped protection catches the end of the chosen fibre. Where all fibres are to be lifted at once, the pushing tool may comprise a cylinder having an annulus therein of, for example, a resilient plastics material. When this tool is pushed over the free end of the cable, the annulus catches all of the fibres. If the annulus has the correct resilience and size, the cylinder will remain at whatever position it is pushed to, and therefore all fibres will remain bowed away from the jonc at the window, ready to be retracted and then inserted one-by-one into the appropriate protective tube.

Irrespective of whether the protective tubes after insertion of the fibres are located around the jonc one by one, or all together as a final step, some locating means must be provided to hold them in position before positioning of the final environmentally protective sleeve. This locating means can in general be provided in any of three ways. Firstly, a barrel as described above may be used. This type of barrel becomes a permanent part of the finished break-out. It holds the protective tubes by an interference fit, or the protective tubes are integral with an extension thereof which slides over the cut end of the jonc. This barrel can be regarded as being tubular with respect to the jonc and either wrap-around or tubular with respect to the tubes, to use the terminology introduced above.

The second way uses an alternative type of barrel, which is a temporary barrel which is used to assemble the protective tubes on the end of the jonc, but is then removed. This barrel will be wrap-around with respect to both jonc and tubes. The ends of the ten (or however many) tubes are assembled in the wrap-around temporary barrel, which is then wrapped around the jonc at a position slightly nearer the free-end than the position where the break-out is to begin. It may be held in its wrapped-around configuration by means of a pressure-sensitive adhesive, or by a tape etc. The fibres are then inserted into respective tubes. When this is done each tube is slid longitudinally to close the gap between it and the position where the break-out is to begin. In order to maintain a fixed position where the break-out is to begin (i.e. to stop the fibres peeling back off the jonc) an adhesive tape may be wrapped around the cable or an O-ring may be positioned over the cable. Thus, the protective tubes are slid until they abut the adhesive tape or O-ring. It can be seen that the wrap-around barrel should allow longitudinal movement of the tubes it holds, but not allow rotation or lateral movement which could, of course, result in the fibres being inserted in an incorrect tube.

We prefer that the barrel has means for identifying the fibres or tubes that it contains. For example the channels or holes around its circumference for the tubes could be numbered from one to ten, for a ten fibre barrel. Alternatively colour coding could be provided. Every channel need not, of course, be marked: if for example the first, third and fourth channel (any channel being numbered the first) were all marked, even in the same way, then all channels could be uniquely identified. This idea may be developed such that any barrel can be used for a fibre sequence that runs clockwise around the jonc and for the same sequence running anticlockwise. This situation may arise at a splice where the two cable ends to be joined are opposite ends of similarly manufactured reels of cable. Here a fibre sequence marked on the jonc at the end of one cable will appear clockwise, and that at the end of the other cable will appear anticlockwise. This versatility of the barrel can be achieved using a tubular barrel if opposite ends of the barrel are marked accordingly, and in the case of a flexible sheet wrap-around barrel it can achieved if opposite surfaces of the sheet are marked accordingly, the sheet then being wrapped around the jonc with the appropriate face of the sheet outwards.

The cable (particularly the jonc of a cable) may of course be marked in a similar way to identify the fibres it carries. It is in conjunction with such cable marking that the means for correlating of the invention is preferably used. The means for correlating is preferably able to correlate the coding of the tubes with each of the clockwise and anti-clockwise sequences referred to. For example, a matching between a set of colours and the first, third and fourth cable markings may be provided.

The third means mentioned for locating the tube is, however, preferred, and this may comprise the end of the jonc itself, optionally with some outer restraining member such as an O-ring or a tape wrap which allows longitudinal movement of the tubes for the reason indicated above. In this case the lateral location is by means only of the jonc, and not (as in the previous case) by some discrete element.

Some inventive features concerning the protective tubes themselves will now be discussed. One of the most difficult steps involved in protecting a break-out in this way is insertion of the fibres into the protective tubes. This is due simply to the small dimensions involved: the diameter of the fibre will generally be from 185–250 microns, and the internal diameter of the tubes is preferably from 200 to 800, more preferably from 300–500, especially about 450 microns. The coefficient of friction for the outer material of the fibre against that of the tube will be important, but little difficulty is found in sliding the fibres within the tube once the tip has been inserted, except that the job is tedious and fibre breakage may occur due to the large lengths that have to be inserted (a total of say 40 m when splicing two ten fibre cables). Because of this, we prefer to use the installation tool of the invention, which will be discussed in detail below in connection with the drawings. A preferred material for the tubes is nylon or polyvinylidene fluoride, which is may be cross-linked in order that it retain its strength under any heat which may be applied to affect heat-shrinkage of any environmental seals. In this context, the requirement mentioned above that the fibres within the tubes must be free to move, may be repeated.

The tubes will generally be stored in a coiled configuration after installation. This can allow stress-reduced or stress-free thermal cycling of the temination or splice. Stress can result from the different extents of thermal expansion and contraction of the fibres and of the tubes. If the tubes have a large diameter and are stored in a coiled configuration then the length of fibre appropriate to the coil will depend on where within the coil the fibre lies: the inner surface of the coiled tube providing a shorter path than the outer surface. The fibre may be secured within the tube with both following a straight line. After the ends of the tube have been effectively fixed to the fibre (by securing the tube for example to a jonc and to a splice) the tube and fibre are then coiled. This will result in the fibre lying along a path having a length between those of the outer and inner surfaces mentioned above. Relative expansion and contraction of the tube may therefore occur without damage to the fibre or to any seals at the end of the tube. The system could of course be arranged such that the fibre initally following the large path, allowing only for contraction, or intially followed the shorter path allowing only for expansion. If the tube remained straight expansion could of course occur. Furthermore, a length of fibre greater than the linear length of the tube could be installed in a straight tube, thus allowing for contraction The protective tubing running from a jonc to a splice is preferably in three sections as follows: Kynar (trade mark) clear US 0.4/0.8; RNF (trade mark of Raychem) colour coded 3/32 150 LG; and Kynar clear ⅛ 950 LG. This concept may be used in the absence of other methods or kits or articles described herein.

Various techniques have been devised for increasing the size of the tubes at the ends into which the fibres must be inserted. Firstly, the tubes may be cut at an angle to produce a larger hole. A second technique is to heat the ends of the tubes which, depending on the processing history of the tubes, will cause them to expand to a certain extent. A third method is to expand the ends mechanically or by internal pressure, and in this case cross-linking is particularly useful. The expanded region can be shaped to fit the groove in the jonc. The expansion can occur at the middle of a double length tube which is then cut.

In each of these cases, the end of increased diameter may usefully be used to help locate the tube on the jonc against longitudinal movement once it has been properly positioned. For example the enlarged end could be slipped under an O-ring around the jonc A further technique for facilitating insertion of the fibres has been devised which, although it need not involve modification to the tubes, can usefully be mentioned here. A barrel of any of the types mentioned, but particularly a temporary barrel which forms part of the clamping tool may be designed in the following way. A series of longitudinal holes are provided, into one end of each of which a tube is inserted and into the other end of which the fibre is inserted. The end for insertion of the fibre is funnel-shaped in order to guide the fibre.

Insertion of the fibre into an end of a tube may be helped by applying a vacuum to the opposite end. The vacuum may be applied by a vacuum line or a syringe.

Instead of using one protective tube for each fibre, two (or more) may be used one of which fits inside the other. This telescopic arrangement allows at will the total length of break-out fibre to be covered, or a part of it to be exposed. This is useful when the breakout is for the purpose of making a splice since it allows a region of the fibre to be exposed for the purpose of injecting light into the fibre. The telescope can then be lengthened in order to cover the exposed region of the fibres either side of the splice, and also to cover the small tube within which the splice was made. A further tube around the protective tubes may be provided to straighten the tubes after they have been bent during the light launch/light read splicing technique. The ends of the two protective tubes may be expanded in order to cover the splice tube. Such a telescopic arrangement can reduce stresses that may otherwise result from differential thermal expansion or contraction between fibres and tubes. A further advantage of telescopic protective tubes is that "re-entry" can be made to the splice simply by cutting the splice out of the line. This can be done since the new fibre ends can be exposed and there will be plenty of length available in the tubes for covering a new joint.

It may be desirable that the protective tubes or a part of each of them be transparent, particularly to visible light. This allows light to be lauched through the protective tubes into the fibres, at a bend in the covered fibres, for the purpose of aligning the fibres where a light launch/light read technique is used.

Some techniques by means of which the protective tubes may be identified are as follows. First, they may be located on an organizer in a specific way to align with marks on the board. Secondly, the tubes may themselves be marked This may be achieved by painting or otherwise colouring the tubes or by installing coloured bands around the tubes. Such bands may be shrinkable, preferably heat shrinkable, into engagement with the tubes. A splice between fibres can be identified by colouring the small tube within which the splice is made. The colouring used may involve (say) ten different colours, or the single colour or marking system described above in connection with the barrel or the cable.

The protective sleeve which may be installed over the break-out region to bridge the ends of the protective tubes is preferably heat shrinkable. It must grip the tubes sufficiently well, but must not cause them to collapse and grip the fibres. Suitable materials for this sleeve may be, for example, polyvinylidene fluoride or ethylene/vinylacetate copolymer. The sleeve may be provided with an internal adhesive or sealant, preferably located as annular rings close to each end of the sleeve so that no contamination of the exposed fibres occurs as they emerge from the sleeve to enter the protective tubes. Sealants are preferred, particularly mastics. The sleeve may be provided at a centre region thereof with a liner of precise diameter for installation over the jonc and fibres with out damage.

The invention and situations in which the invention may be used are illustrated by the following drawings in which:

FIGS. 1a, b shows a optical fibre cable break-out;

Figure 9A:
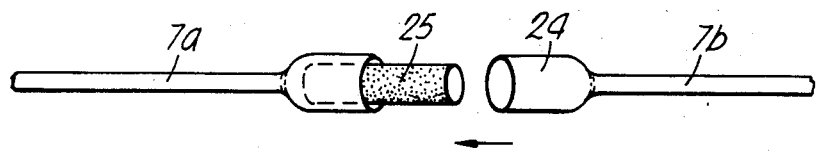
Figure 9B:
Figure 9C:
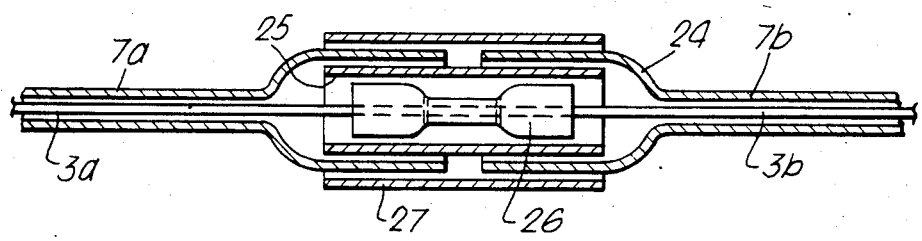
Figure 11:
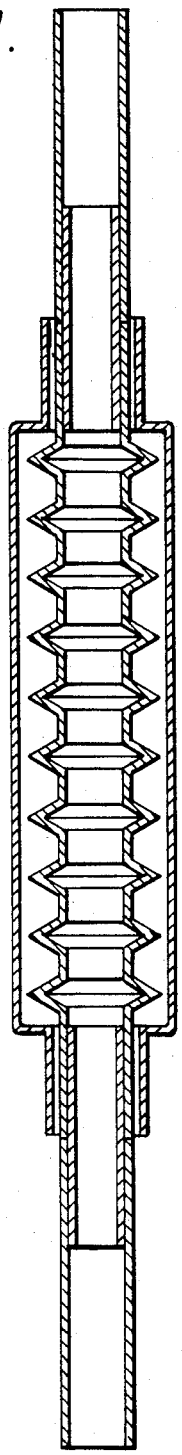

FIGS. 9a, b, c show the use of the protective tubes in the protection of optical fibre splices;

FIG. 11 shows a tool suitable for applying the fibres to the jonc; and

Figure 12:
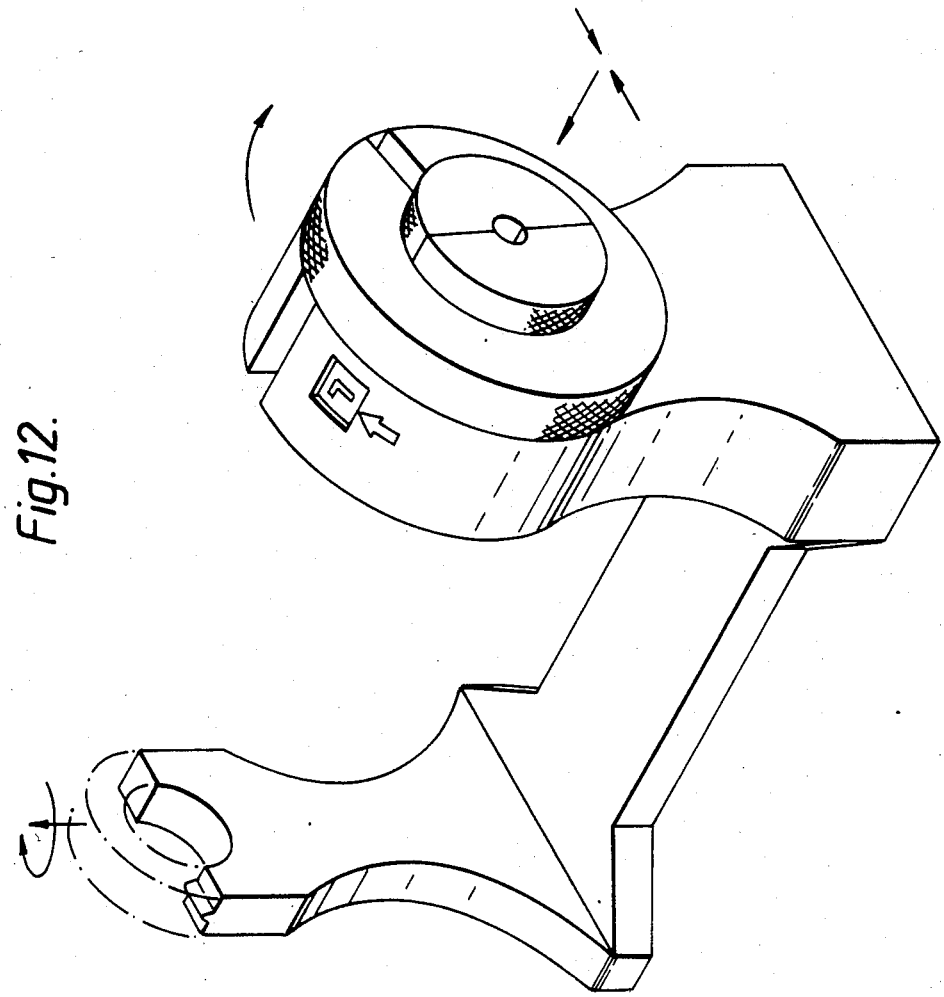

FIGS. 12 shows a holding-tool suitable for applying the tubes to the jonc; and

Figure 13:
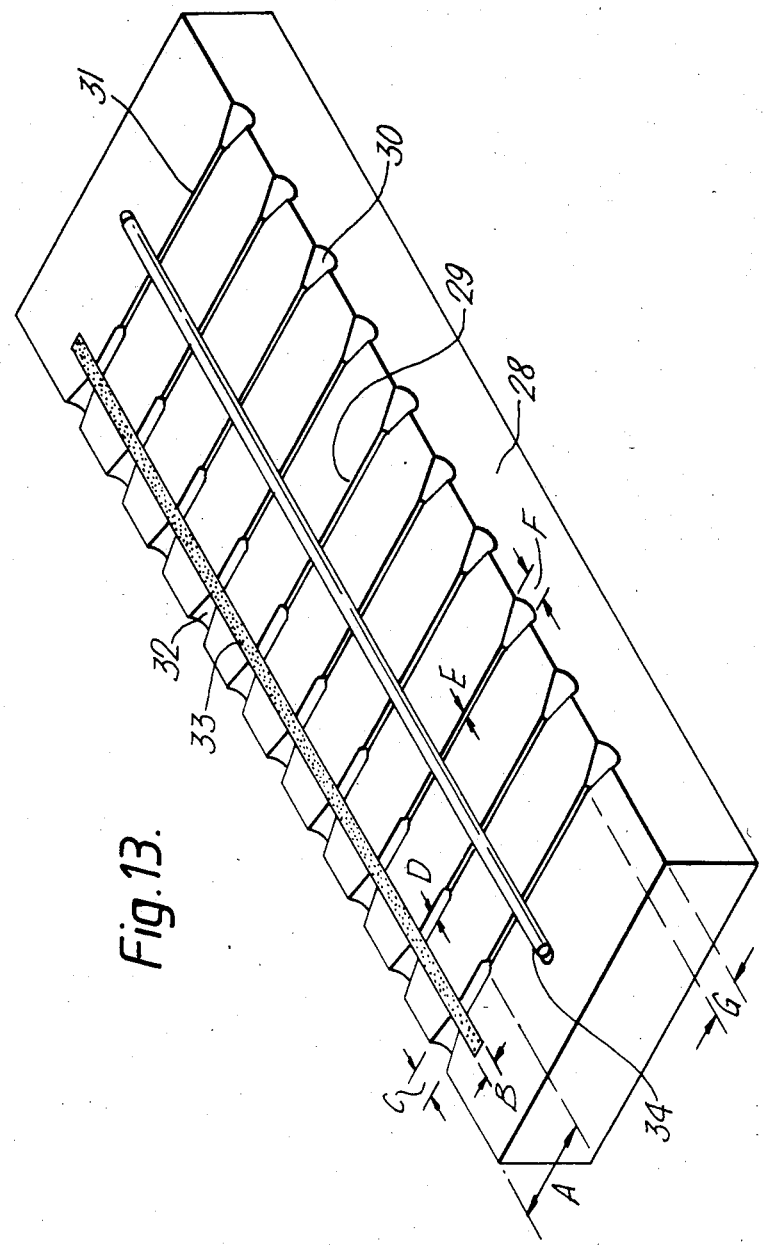
Figure 14:
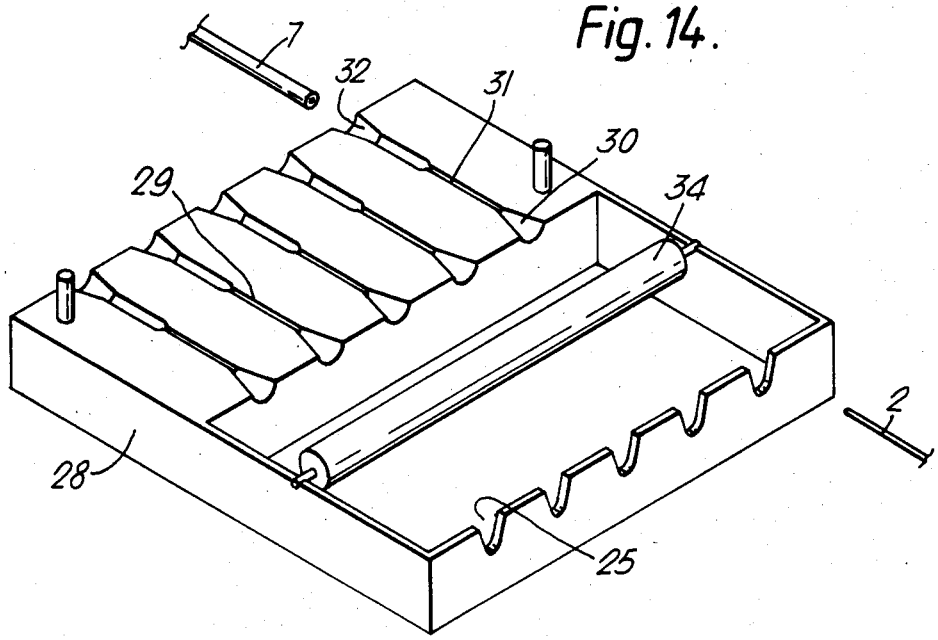
Figure 15:
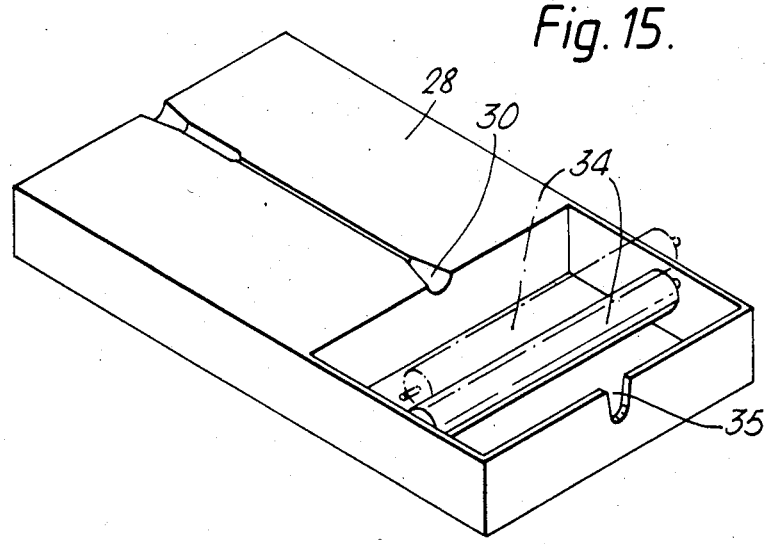

FIG. 13–15 show insertion tools for facilitating insertion of fibres into protective tubes.

Figure 1A:
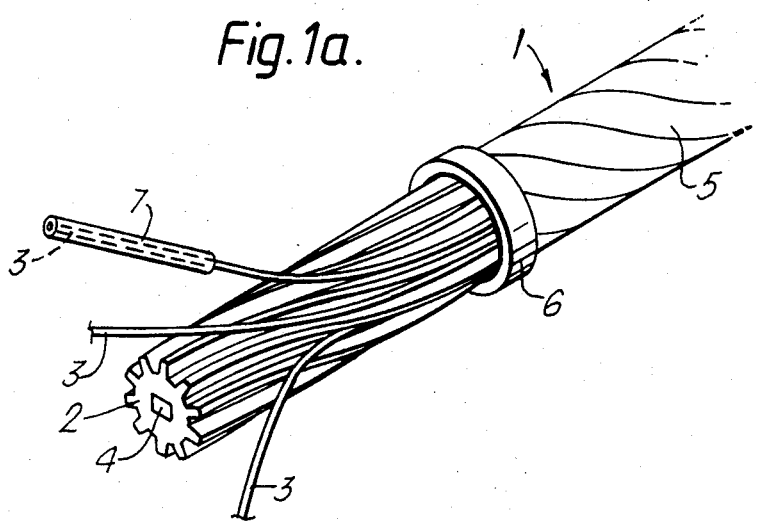
Figure 1B:
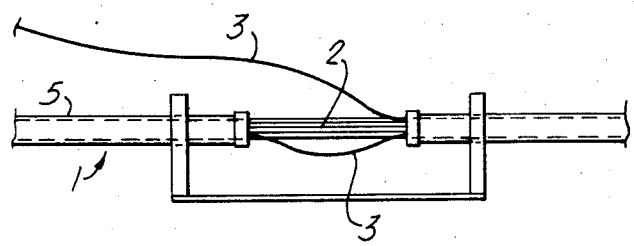

FIG. 1a shows a cable 1 comprising a jonc 2 carrying optical fibers 3. A reinforcement 4 runs through the jonc. A jacket is labelled 5. An O-ring or adhesive tape 6 prevents the breakout spreading along the cable. A protective tube 7 is shown around one of the fibres 3. FIG. 1b shows a window of jonc exposed; one fibre 3 has been removed from the jacket at the end of the cable, and another is shown bowed ready for removal.

An environmental seal may be provided at an end portion of the tube 7 to prevent passage of contaminants along the fibre either into the tube or under the jacket of the cable. Such is seal is preferably made by means of a gel. Preferred gels are materials having a cone penetration value of 100–350 ($10^{-1}$ mm) and an ultimate elongation of at least 200%. More preferred values being 200–300 ($10^{-1}$ mm) and at least 500% respectively. The cone penetration values are as measured by ASTM D217–68. An elastic modulus of less than $10^7$ dynes/cm$^2$ is preferred. Silicones and oil-extended polyurethanes are suitable materials. An alternative preferred material is a mastic such as a mixture of substantially noncrystalline materials, for example, bituminous materials, elastomers, or thermoplastic polymers optionally with inert fibrous or powdered fillers.

Figure 2:
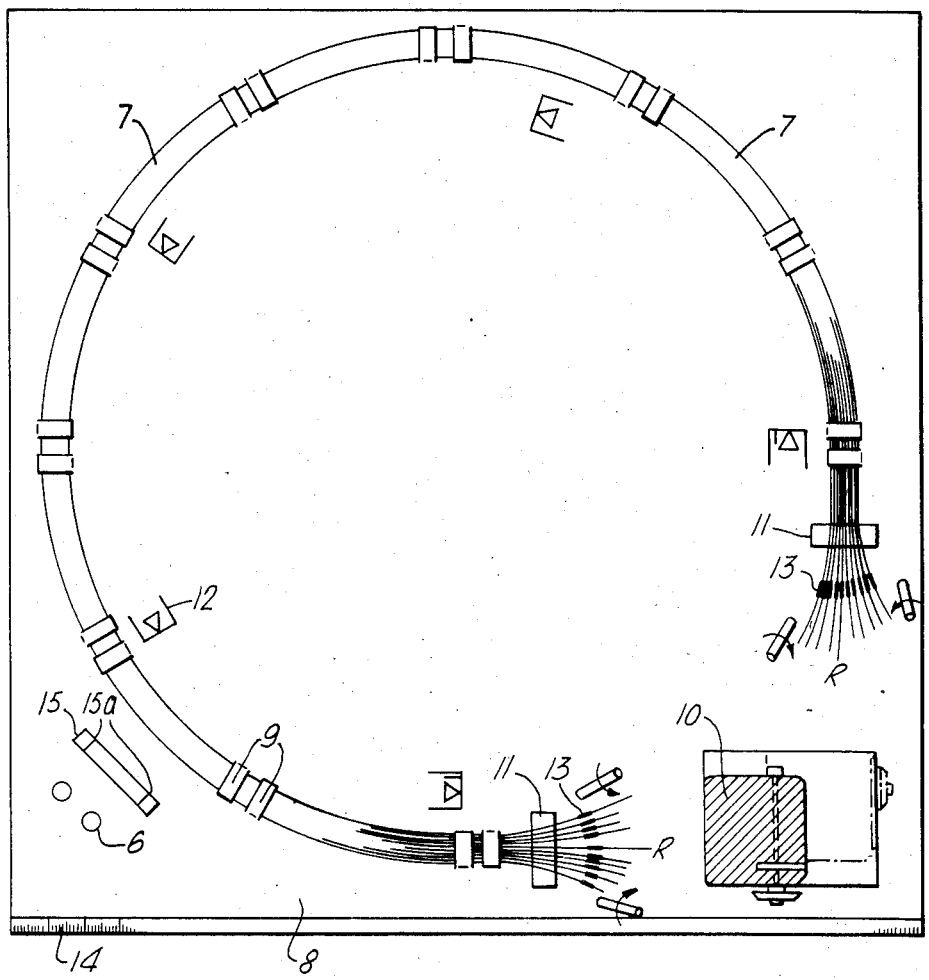
FIGS. 2–5 show four kits containing protective tubes.

FIG. 2 shows an organizer board 8 carrying a series of protective tubes 7. The tubes are held to the board by cut-outs 9 stamped from the material of the board. A holding tool 10 is shown within which a cable will be secured. The fibres will then be removed from the cable and inserted into respective tubes 7. The ends of the tubes 7 are held onto the board 8 by pressure sensitive adhesive pads 11. The board shown in FIG. 2 is particularly for a break-out technique where all fibres are removed from the jonc before any is inserted into a protective tube. The bundle of fibres thus exposed is secured to the board in an orderly fashion by means of clips 12. The tubes 7 are provided with colour coded identification sleeves 13. Other features of the organizer board are a measure 14 by means of which the correct extent of cable stripping etc. can be determined, and a protective sleeve 15 for insertion over the break-out region. The sleeve is preferably heat-shrinkable and has mastic rings 15a at its ends, or an internal coating of an adhesive such as a hot-melt adhesive.

Figure 3:
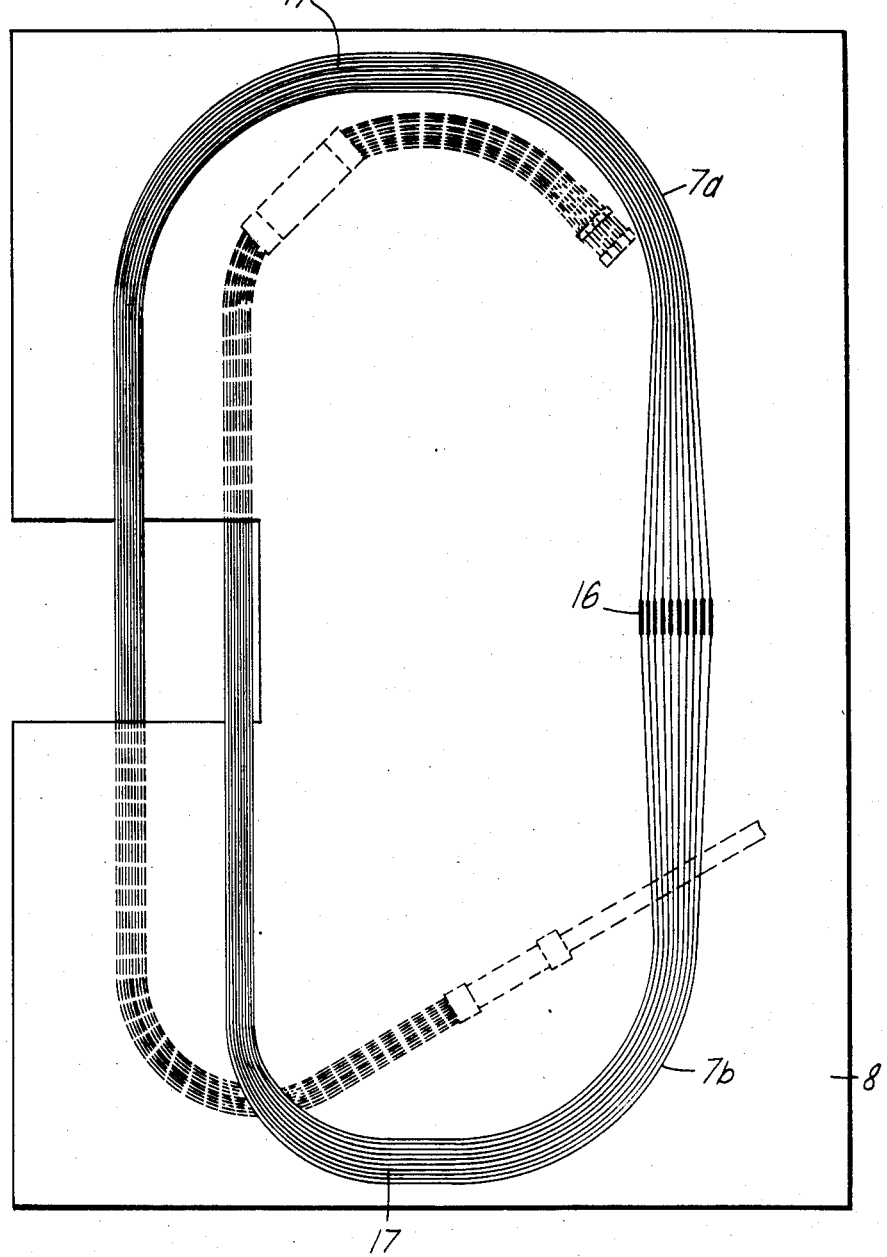
Figure 4:
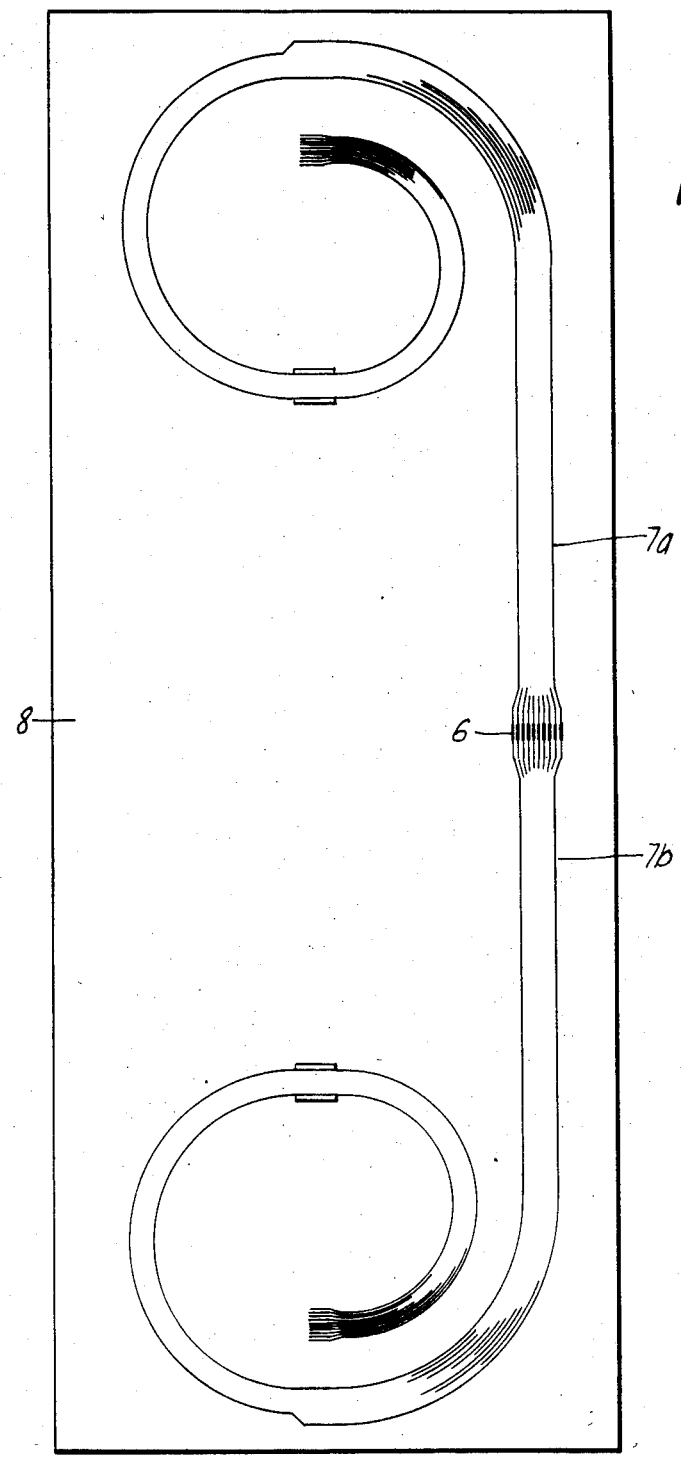

FIGS. 3 and 4 show alternative designs of organizer boards 8 for use where the break out is for the purpose of making a cable splice. Each board therefore contains two sets of ten protective tubes, 7a and 7b. Tubes from each set are joined at a splice region, or by splice protection tubes, 16. In FIG. 3, the two break-outs are formed on the underneath of the board 8 as drawn, one to each of the dotted ends of the sets of tubes. The top side of the board is then used during the splicing operations. Each tube 7 consists of two tubes in telescopic arrangement, the end of the outermost tube being at positions marked 17. Because of the telescopic nature of the tubes 7 the fibres can be inserted to form the break-out with the joint 16 intact. This joint is then broken and the telescope contracted to make the splice. The joint 16 is then re-made over the fibre splice.

In FIG. 4 both the break-out and splicing operations are performed on the same side of the board 8.

Figure 5:
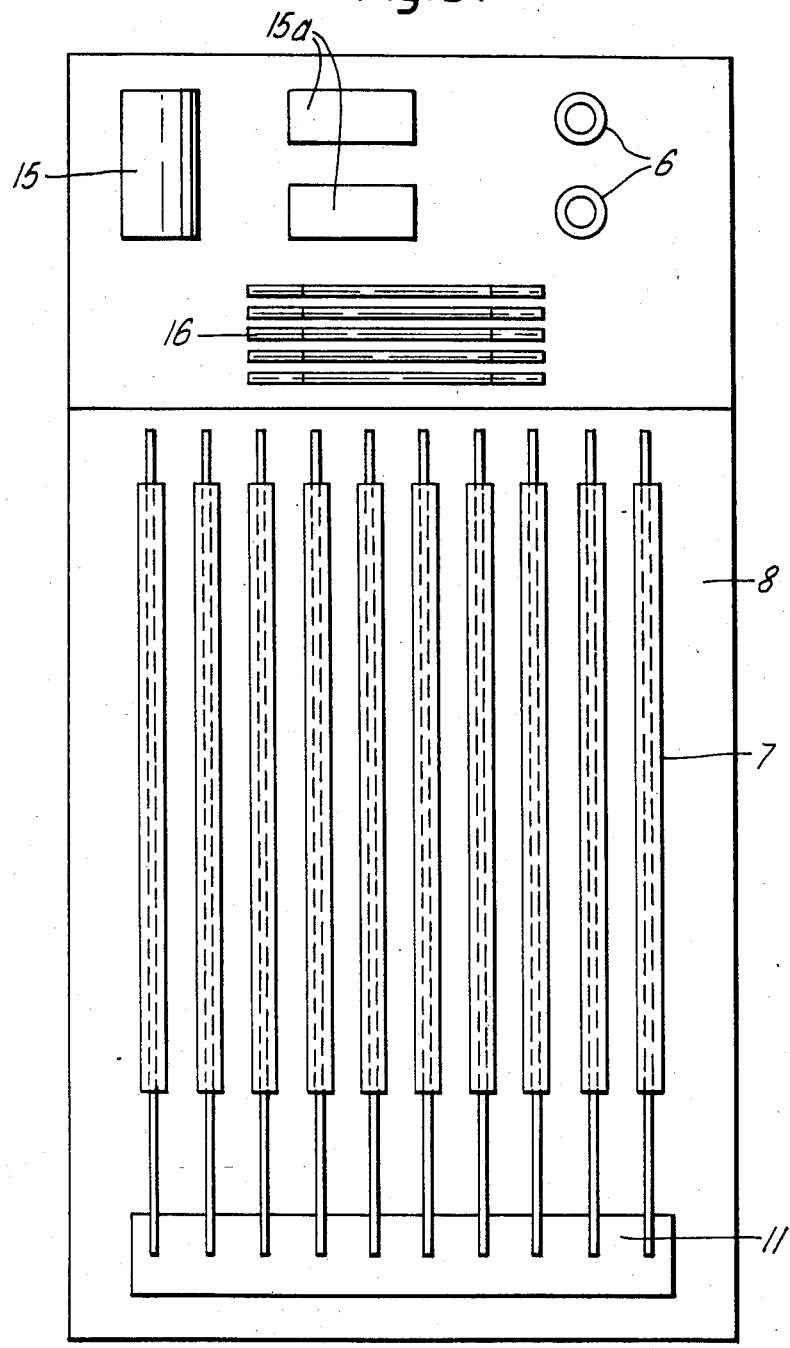

The kit 8 illustrated in FIG. 5 is of slightly different design. It is preferably about 1100 mm long and 80 mm wide. A series of tubes 7 (optionally telescopic) is arranged in the kit 8 and held in a particular configuration by a strip of pressure-sensitive adhesive 11 from which they can be easily removed. Another part of the kit is shown with various other components required for cable termination or cable splicing. The components illustrated are for cable splicing.

The tubes may be colour coded or colour-coding may be provided on the strip 11. The kit may also contain the means for correlating the colour or other coding with identification on the cable. The means for correlating may comprise a card (generally of cardboard but the term as used herein includes any material) which bears the relevant information, preferably in pictorial form.

Where a splice is to be made between two cables each carrying ten optical fibres, two boards as shown in FIG. 5 will be required. A break-out is constructed at an end of each cable, for which the ten tubes 7 will of course be required. Each of the two break-out regions is then protected as described above by means of a recoverable tube 15, which is preferably transparent and 40–80 especially about 60 mm long. Sealant strips 15a are preferably wrapped around the cable immediately either side of the break-out and the tube 15 shrunk over them, such that the strips 15a provide seals at each end of the tube 15. The O-rings 6 may be used as an installation aid during preparation of the break-out. The tubes 16 are for protection of the splices to be made between the fibres from each cable. These tubes are preferably 60–100 especially about 80 mm long. Five such tubes 16 are provided in each kit, so that the two kits required will contain ten splice protection tubes, sufficient for the ten splices to be made. The ends only of the tubes 16 need be recoverable. Each tube 16, which may be colour coded, is recovered over the small splice tube within which the splice is made and down onto engagement with protective tubes 7 at either side of the splice. Where a kit of the general type shown in FIG. 5 is to be used for a cable termination (rather than for a splice), ten termination protection tubes (preferably colour coded) would be provided rather than the five tubes 16. Such termination protection tubes may be of non-uniforn cross-section, having a narrow end for recovery onto a protective tube 7 and a wide end for recovery onto the connector or housing where the fibre is to be terminated.

Figure 6:
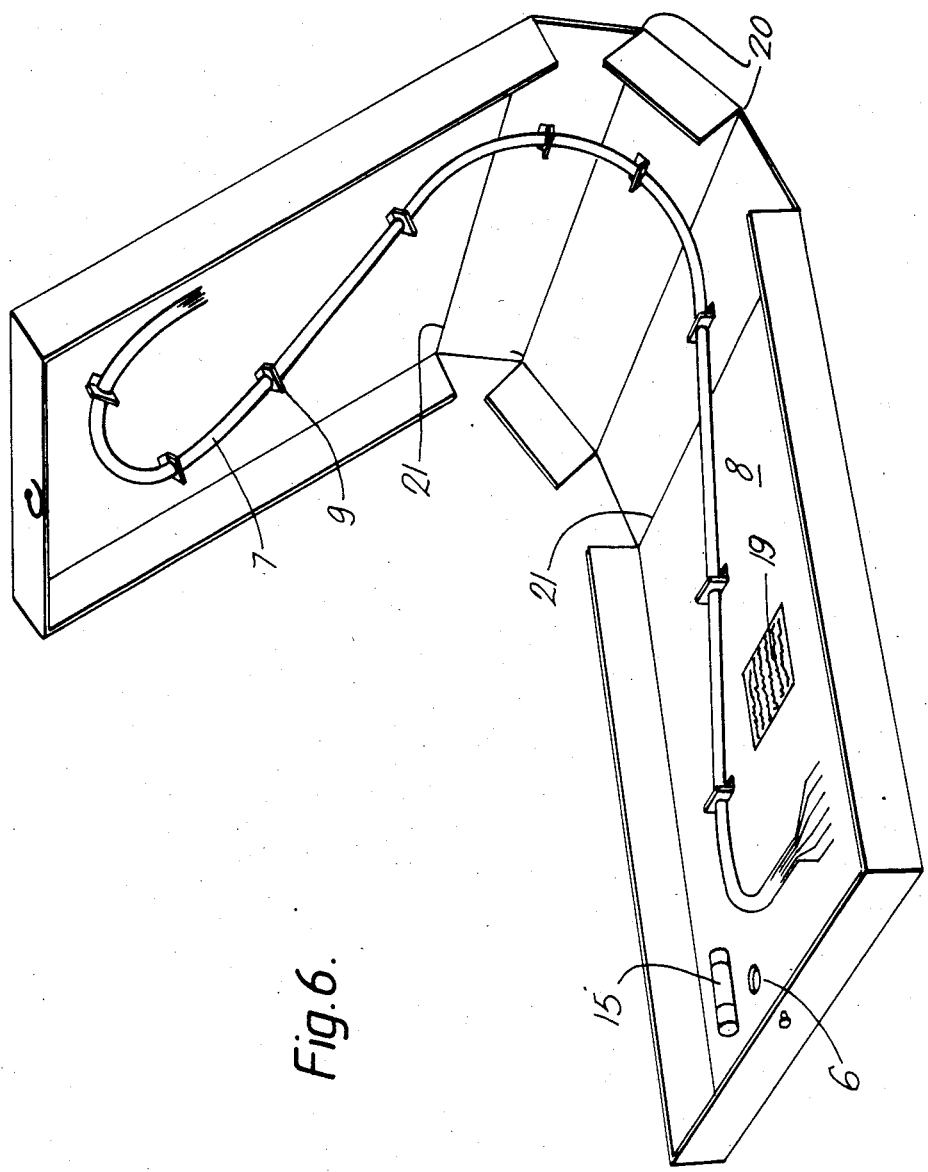
FIGS. 6 and 7 show two physical forms of organizer board.

FIG. 6 shows a board 8 provided by a carton 18 in which the tubes 7 are supplied. The carton has printed thereon a set of instructions 19. The carton unfolds along fold lines 20, and if a greater curvature is desired, extra folds 21 may be provided. The carton may conveniently be made of cardboard or similar material, and will preferably be disposable.

Figure 7:
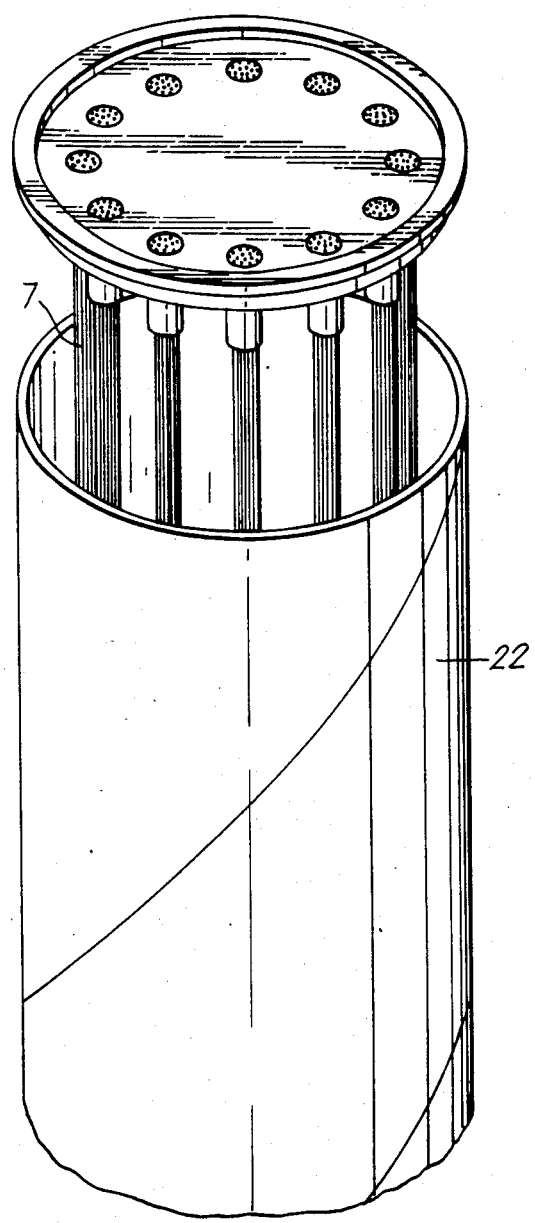

An organizer board in the form of a tubular carton 22 is shown in FIG. 7.

Figure 8:
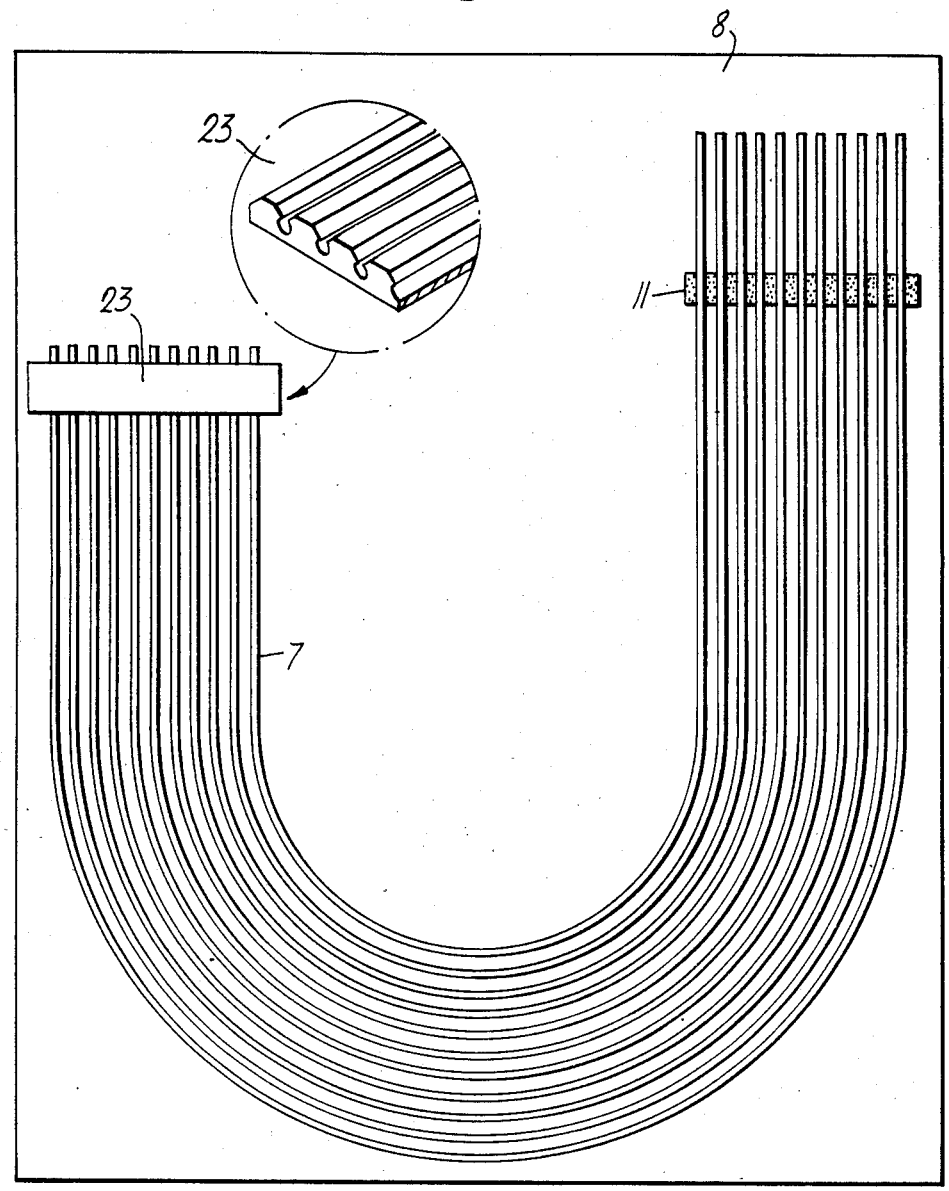
FIG. 8 shows in greater detail the fixing of a series of tubes to the board.

FIG. 8 shows a wrap around barrel 23 having longitudinal channels in which the tubes 7 are a snap fit.

In FIGS. 9a, b and c the various stages in protecting a fibre splice are shown. The tubes 7 have flared ends 24 for encasing a colour coding tube 25 which is to cover the small splice tube 26. The splices 16 shown in FIGS. 3 and 4 include the identification tube 25. The original joint between the two tubes 7a and 7b is broken and the fibers are made to emerge by collapsing the telescope as previously described. The tube 25 is placed over one of the fibres 3a or 3b and an outer protective sheath 27 is placed over one of the tubes. The fibre splice is then made inside the tube 26, and the tube 25 is re-positioned, the telescope is extended and the sheath 27 is shrunk into position. The sheath 27 should be transparent so that the colour coded tube 25 is visible.

An end portion of the tubes 7a or 7b may be provided with an environmental seal to prevent contaminants passing along the fibre. Such a seal is preferably made by means of a gel or a mastic, preferred materials being described above.

Figure 10:
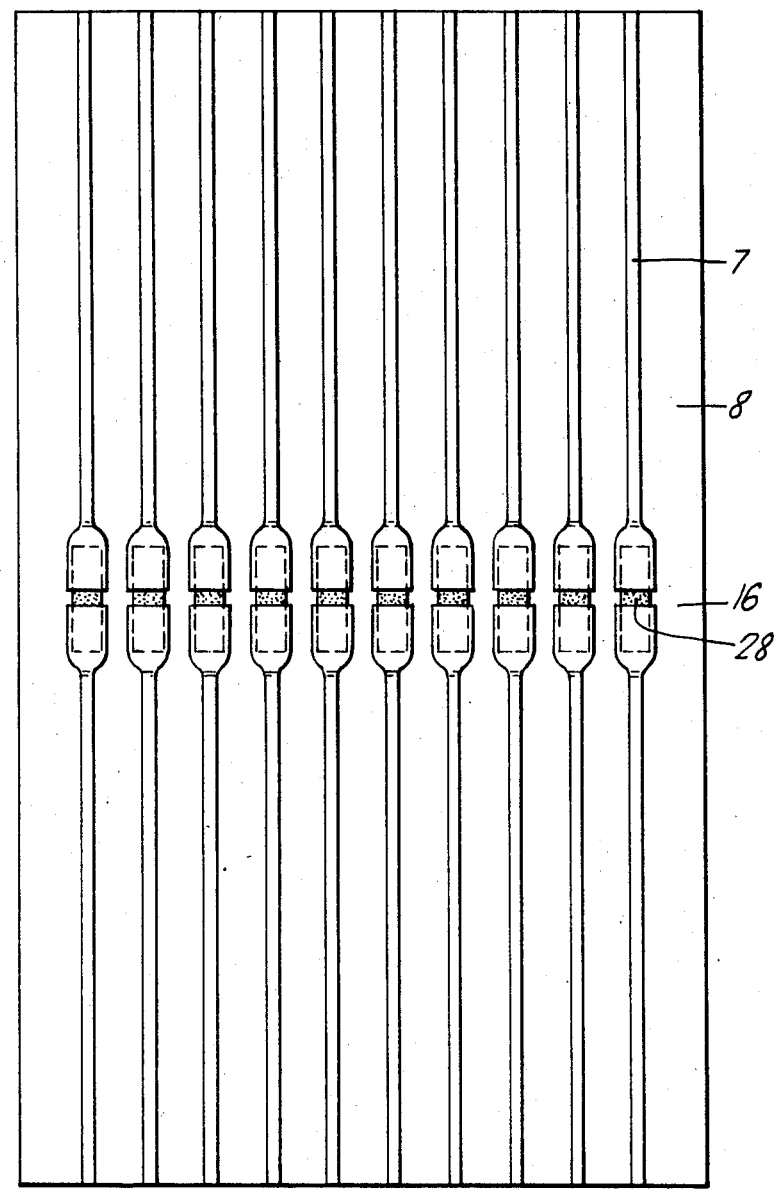

An array of splices is shown in FIG. 10.

FIG. 11 shows an inventive encapsulation for a splice between two optical fibres in protective tubes. A convoluted strain-relief tube is provided which is surrounded by a support tube. Inside each end of the strain-relief tube is provided a transition tube (drawn cross-hatched). A heat-shrinkable sleeve then extends from each end of the transition tube to provide a seal between the ingoing protective tubes and the transition tube. The spliced optical fibres and their protective tubes are omitted from the drawing for clarity. The purpose of the corrugated strain relief tube is to allow relative movement between the protective tubes and the internal optical fibre that may result from their different coefficients of thermal expansion. The optical fibres may be effectively fixed relative to their protective tubes at the break-out position on the jonc, and therefore relative movement must be accommodated elsewhere. The corrugated tube can be compressed in response when the system is heated (the protective tube having in general a higher coefficient of expansion than the glass optical fibres) and can extend on cooling, thus allowing thermal cycling. A change in length of the corrugated tube of at least 5 mm, preferably at least 10 mm, especially at least 25 mm is preferred such as allowable change may be attainable from the rest position by compression, by extension or by both.

FIG. 12 shows a tool for holding a cable while the fibres are removed for insertion into the tubes.

FIG. 13-15 show various embodiments of a tool for faclilitating insertion of fibres into protective tubes.

FIG. 13 shows a block 28 which may be used alone but which is preferably used together with a substantially mirror image block which lies on top of it. Grooves 29 (or where a single block is used, holes 29) are provided for example by machining. At one end, the grooves 29 broaden into a funnel shaped portion 30. A central portion 31 is of smaller size and preferbly of V-shaped cross-section. The other end 32 of each groove 29 is broader and also may terminate in a funnel shaped portion. The portion 30 serves as a guide means for inserting the fibres into the narrow groove 29. The protective tubes are inserted into the broader grooves 32. All portions of the grooves 29 preferably have a common axis. A gripping means 33, such as a foam or rubber strip, is provided to retain the protective tubes in the groove 32. A means for advancing the fibres into the protective tubes is provided at 34. The means for advancing is preferably a roller, which may be rotated by hand but which is preferably rotated by means of an electric motor. Where two blocks 28 are provided each may contain a roller 43, or only one roller may be provided.

The dimensions shown in FIG. 1 are preferably as follows:

A 5-15 more preferably about 10 mm
B 2-6 more preferably about 4 mm
C 2-5 more preferably about 3 mm
D 0.5-1.5 more preferably about 0.9
E 0.15-0.35 more preferably about 0.27
F 3-7 more preferably about 5
G 3-10 more preferably about 6.

The tool shown in FIG. 14 may also be used as shown, but preferably a second mirror image block is combined with the one shown. Differences from FIG. 13 are that pegs are shown for locating the two mirror image blocks in correct alignment, that only five fibres can be dealt with at a time, that the driving roller is positioned outside the grooves, and that remote guiding means 35 are provided for the fibres. A fibre 3 and a protective tube 7 are shown in part.

FIG. 15 illustrates a similar tool, but designed for a single fibre. The means for advancing the fibre comprises a pair of rollers 34 positioned such that the fibre passes through their nip. As before, a second block 28 is preferably used in conjunction with the one shown, and the rollers are preferably driven by an electric motor.

An advantage of providing the tool as two blocks 28 is that the tubes and fibres can easily be placed in groove portions 32 and 30 respectively when the blocks 28 are separated. Then, the blocks can be brought together, and the means for advancing operated

What is claimed is:

1. A kit-of-parts suitable for terminating an optical fiber cable having optical fibers disposed cylindrically therearound, comprising: a plurality of protective tubes each suitable for housing individual ones of the optical fibers; a heat-shrinkable sleeve suitable for securing the tubes with respect to the terminated cable; means for identifying respective protective tubes; and means for correlating the identification of the tubes with respective fibers of the cable, the fibers being disposed cylindrically around the cable.

2. A kit-of-parts according to claim 1, in which the means for identifying comprises colour-coding of the tubes; and the means for correlating comprises a card which matches the colour-coding of the tubes with a position indicator of the cable which identifies the fibers by means of their relative position in the cable.

3. A kit-of-parts according to claim 1 which additionally comprises a gel or mastic for providing an invironmental seal at an end portion of a protective tube.

4. A kit-of-parts according to claim 1, in which the means for identifying comprises an article to which the tubes are attached, the article being colour-coded; and the means for correlating comprises a card which matches the colour-coding of the tubes with a position indicator of the cable which identifies the fibers by means of the relative position in the cable.

5. A kit-of-parts according to claim 4 which additionally comprises a gel or mastic for providing an environmental seal at an end portion of a protective tube.

* * * * *